Feb. 9, 1943.  H. N. STEPHAN  2,310,878
MACHINE TOOL
Filed June 12, 1940   3 Sheets-Sheet 3

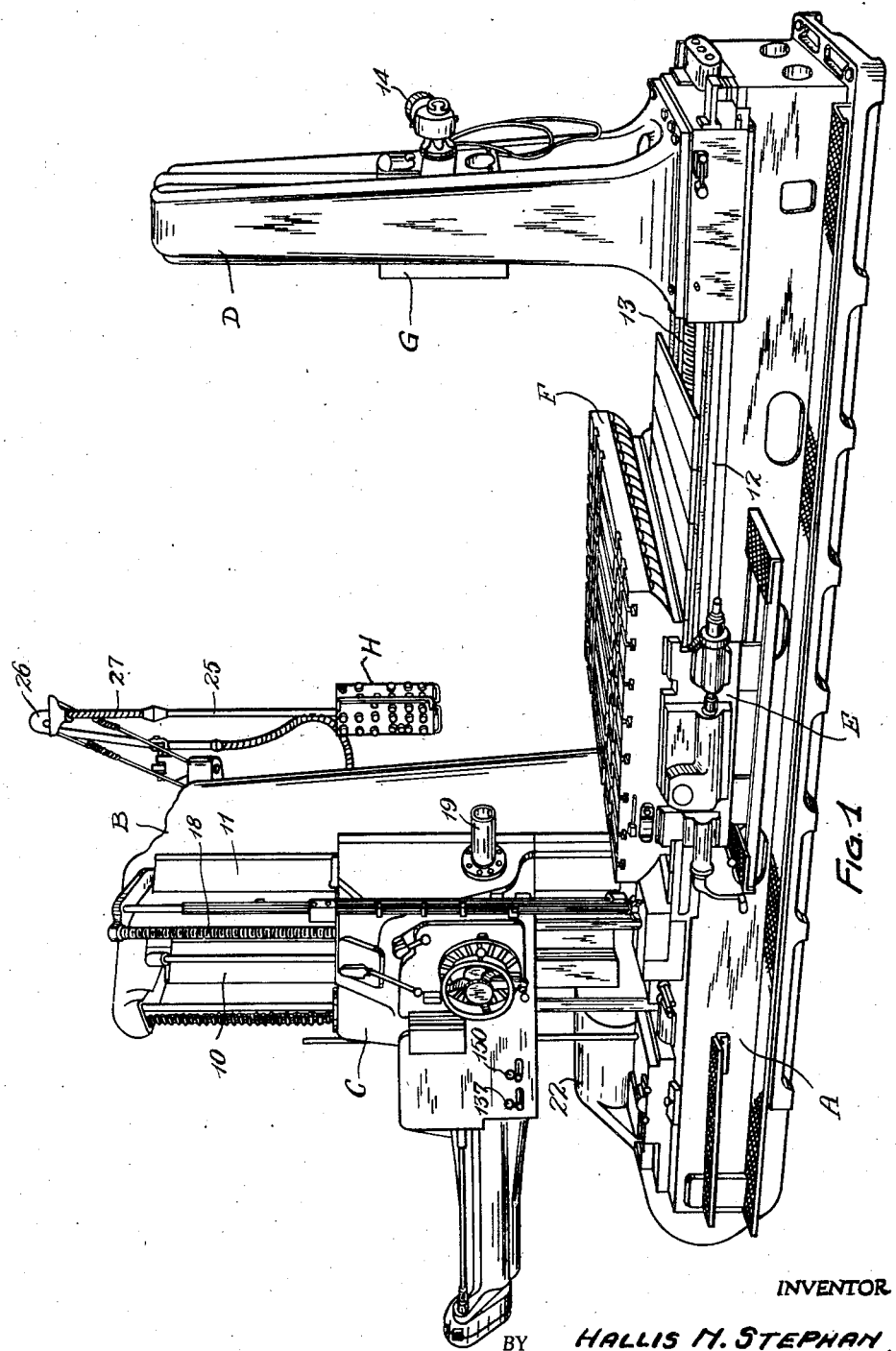

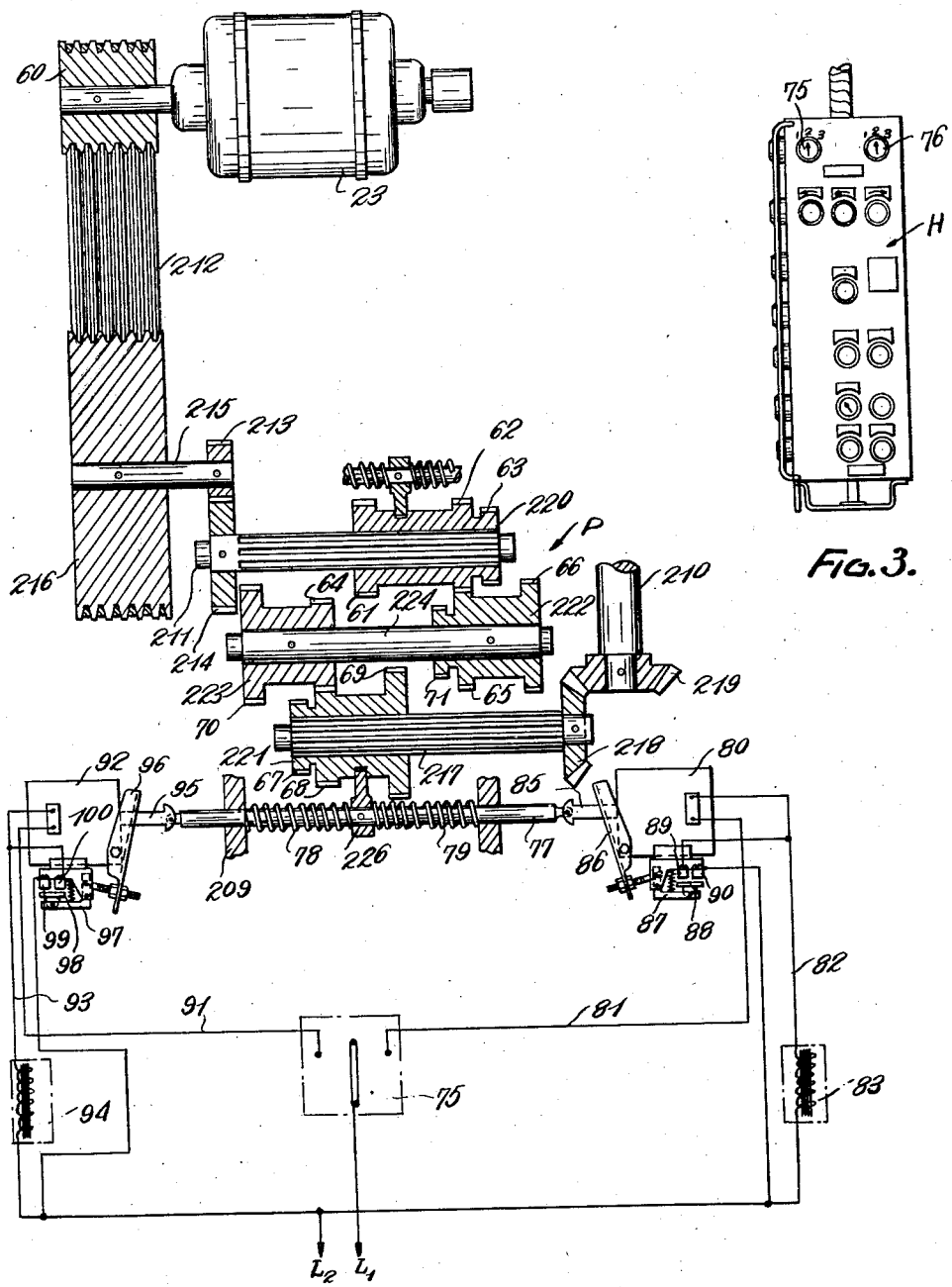

INVENTOR.
HALLIS N. STEPHAN
BY Kwis Hudson & Kent
ATTORNEYS

Patented Feb. 9, 1943

2,310,878

UNITED STATES PATENT OFFICE 2,310,878

MACHINE TOOL

Hallis N. Stephan, Cleveland Heights, Ohio, assignor, by mesne assignments, to The Lucas Machine Tool Company, Bratenahl, Ohio, a corporation of Ohio Application June 12, 1940, Serial No. 340,143

11 Claims. (Cl. 77—3)

The present invention relates to electrically actuated or controlled means for shifting or moving machine parts, such as the movable element or elements of a sliding gear speed change transmission, or the movable element of a clutch, and to machine tools especially horizontal boring machines embodying such mechanism.

The principal object of the invention is the provision of novel electrically actuated or controlled mechanism for moving or shifting a movable member, such as the movable element or elements of a sliding gear speed change transmission or the movable element of a clutch, etc., which mechanism will be reliable, positive, and comparatively silent in operation and which will not subject the various parts to undue shock and strain, etc.

Another object of the invention is the provision of a novel electrically operated or controlled mechanism including a solenoid for engaging devices, such as change gears, clutches, and the like, wherein the initial relative movement between the members is effected by relatively low power and concluded by relatively high power.

Another object of the invention is the provision of a novel machine tool such as a horizontal boring machine, comprising a power transmission device or a disengageable drive connection such as a sliding gear speed change transmission or a clutch, either friction or positive drive, and including electrically operated or controlled mechanism for moving the movable element or elements thereof to engage the device, which means will be reliable and positive in operation and will not subject the machine or parts thereof to undue shock, stress, etc.

Another object of the invention is the provision of novel electrically operated or controlled means for shifting a movable device such as a change gear into either of three normal positions.

The present invention resides in certain details of construction and combinations and arrangements of parts, and further objects and advantages thereof will be apparent to those skilled in the art to which the invention relates from the following description of the preferred embodiment thereof described with reference to the accompanying drawings forming a part of this specification, in which similar reference characters designate corresponding parts and in which:

Fig. 1 is a perspective view of a horizontal boring and milling machine embodying the present invention;

Fig. 2 is the diagrammatic view of a speed change transmission of the horizontal boring machine shown in Fig. 1.

Fig. 3 is a side elevational view of the pendant control station;

Figure 4:
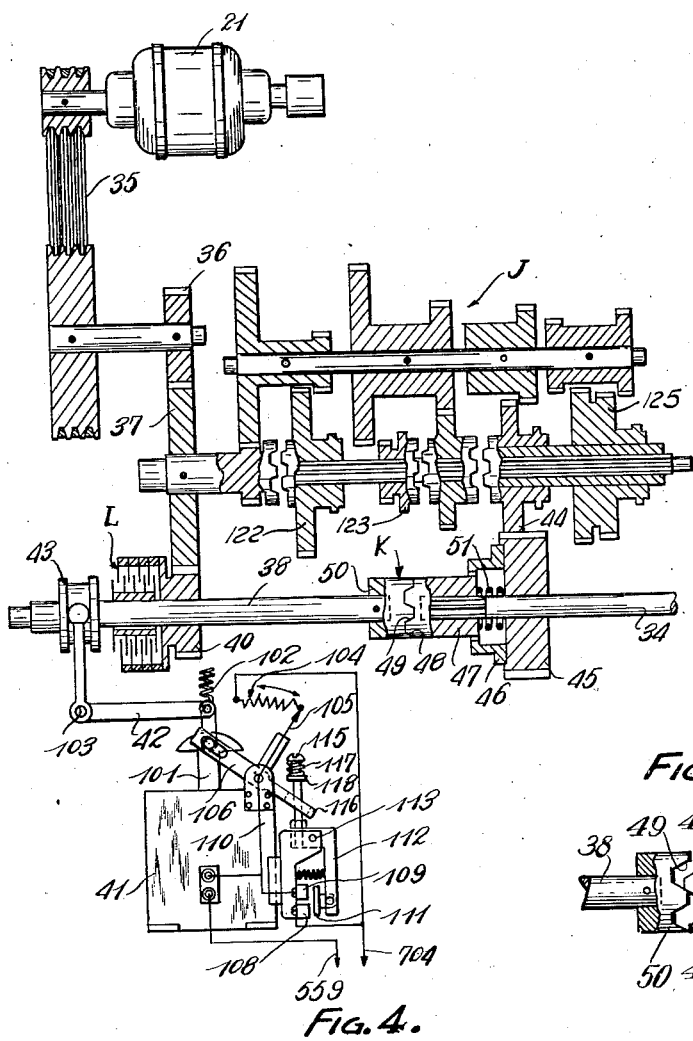
Fig. 4 is a diagrammatic view of the spindle head, table, and saddle feed and rapid traverse transmission of the horizontal boring machine shown in Fig. 1.

While the present invention is susceptible of general application, it is particularly applicable to electrically controlled machine tools such as the pendant controlled horizontial boring machine shown in U. S. Patent to Lucas et al. No. 2,208,312, issued July 16, 1940, on an application Serial No. 254,437, filed February 3, 1939, and is herein shown and described as embodied in such a machine. Only those parts of the machine which are necessary to an understanding of the present invention are herein shown and described in detail.

Referring to the drawings, the machine shown therein comprises a base A provided at one end with a spindle head column B having vertical ways 10 and 11 on the front face thereof, upon which ways a spindle head C is mounted for vertical movement. At the other end of the base or bed A, a backrest or outboard support column D is provided. This backrest or outboard support column is slidably supported on horizontal ways 12 and 13 formed on the upper side of the bed. The ways 12 and 13 also have slidably supported thereon a saddle E, the upper side of which is provided with horizontal ways which in turn support a work table F. A backrest block G is slidably supported for movement along vertical ways formed on the backrest column. The spindle head C which is counterbalanced by a weight (not shown) is adapted to be moved vertically along the ways 10 and 11 by a lead screw 18 rotatably supported in the base A and the spindle head column B and having threaded engagement with a nut fixed in the spindle head. The spindle designated generally by the reference character 19, in addition to being rotatable in opposite directions, is movable in opposite directions longitudinally of its axis to effect both feeding and rapid traversing movements.

The speed and direction of rotation of the spindle, etc., and the different movements of the various elements such as the feed and rapid traverse of the spindle, head, saddle, table, etc., are performed by power and their operation may be controlled from any convenient place about the machine. In the embodiment of the invention shown, five electric motors are employed to perform the various movements or operations as follows: a reversible motor (not shown) commonly referred to as the feed and rapid traverse motor supported on the bed within a guard 22 adjacent to the left-hand end of the machine; a reversible main driving motor 23 arranged for ceiling mounting, also enclosed within the guard 22; a spindle rapid traverse, reversible motor (not shown) mounted on the head C; a reversible motor 14 for clamping and releasing the backrest block; and a reversible motor (not shown) for moving the backrest column D.

The main driving motor 23 is connected to the spindle rotating and feeding mechanism, and the spindle reversible motor actuates the rapid traverse for the tool spindle. The feed and rapid traverse motor 21 is connected to the saddle and table feeding and rapid traversing mechanism and to the spindle head and backrest raising and lowering mechanism. The motors are adapted to be selectively connected to the various operating elements through the medium of suitable speed change transmissions, shafts, gears, clutches, etc., the controls for which are located on or adjacent to the base A, spindle head C, and/or pendant electric control station H fixed to the lower end of a pipe 25 connected to a universally movable arm 26 by a flexible cable 27.

The spindle 19 is adapted to be rotated at various rates of speed by the main driving reversible motor 23 through the medium of speed change gearing designated generally by the reference character P housed in a suitable gear box supported in the bed of the machine; a vertical shaft 210, the lower end of which is rotatably supported in the gear box while the upper end is supported in the head column B; and back gears located in the spindle head C.

The driven shaft 211 of the transmission P is operative connected to the motor 23 through the medium of a V-belt drive 212 connected to a small pulley 60 fixed to the rotor shaft of the motor 23 and a larger pulley 216 fixed to a shaft 215 which latter shaft is in turn operatively connected to the driven shaft 211 by gears 213 and 214 fixed to the aforesaid shafts and continuously in mesh with each other. The shaft 211 carries a three-gear clutch 220 slidably splined thereto, the three gears of which, designated 61, 62, and 63, are adapted to selectively engage gears 64, 65, and 66, respectively. The gear 64 is one of a two-gear cluster 223 fixed to a shaft 224 rotatably supported in the speed change gear box in the base of the machine, as are the other shafts of the gear box, and the gears 65 and 66 are part of the three-gear cluster 222 also fixed to the shaft 224. The speed change transmission P, as shown, also comprises a splined shaft 217 rotatably supported in the gear box 209 and operatively connected to the lower end of the vertical shaft 210 by bevel gears 218 and 219. The splined shaft 217 carries a three-gear cluster 221 slidably splined thereon, the gears 67, 68 and 69 of which are adapted to selectively mesh with gears 70, 64 and 71, respectively. The gear 70 forms a part of the two-gear cluster 223, and the gear 71 forms a part of the three-gear cluster 222 both of which gear clusters have been previously referred to.

Nine different speeds can be obtained by moving or shifting the gear clusters 220 and 221 to different positions. According to the provisions of the present invention, the various positions of the gear clusters 220 and 221 are controlled by electric means from a remote point. As shown in the preferred embodiment, the position of the gear clusters is controlled by electric switches 75 and 76 located on the pendant control station H which includes numerous other switches for controlling other operations of the machine. The mechanisms for shifting and/or controlling the positioning of the gear clusters 220 and 221 are identical and only the mechanism employed for shifting and/or controlling the positioning of gear cluster 221 is shown in the drawings and will be herein described.

The yoke member 226 through the medium of which the gear cluster 221 is moved or maintained in any position, is carried by a rod 77 slidably supported in the speed change gear box 209. The rod 77 and the yoke member 226 are continuously urged to a position where the gears 64 and 68 of the clusters 223 and 221, respectively, are in mesh, which position will be hereinafter referred to as the first or intermediate position, by resilient springs 78 and 79 surrounding the rod 77 and engaging opposite sides of the yoke member 226. Opposite ends of the springs 78 and 79 engage the yoke member 226 and the sides of the gear box 209. Alternatively the intermediate position may be a neutral disengaged position, and other suitable abutments may be provided for the springs 78 and 79. The rod 77 is adapted to be shifted or moved towards the right, as viewed in Fig. 2, to disengage the gears 64 and 68 and engage the gears 69 and 71 by an electric solenoid 80 which, when energized, pulls the rod 77 towards the right.

Energization of the solenoid 80 is under control of the manually operable switch 75 located on the pendant control station H which, when moved or turned to the right, as viewed in Figs. 2 and 3, that is to the position marked "3" in Fig. 3, completes a circuit from the line L—1, through the switch 75, wire 81, solenoid 80, wire 82, and reactance 83 to L—2. The effective ampere turns of the solenoid 80 are comparatively low because of the reactance 83 and the rod 77 is moved towards the right under comparatively low power against the resistance of the spring 79, which at the beginning of the movement of the rod 77 is comparatively weak. The initial movement of the rod 77 towards the right is at a comparatively slow rate of speed but substantially coincident with or shortly after engagement of the teeth of the gear 69 with the teeth of the gear 71. The ampere turns of the solenoid 80 are increased by the engagement of the armature 85 of the solenoid 80 with a member 86 pivotally supported on the solenoid and operatively connected to a bell crank 87 provided with a movable contact 88 which causes said contact 88 to engage stationary contacts 89 and 90 operatively connected to the line L—2 and the wire 82, respectively, short circuiting or cutting out the reactance 83. When full current and voltage is applied to the solenoid 80, the gears 69 and 71 are caused to fully mesh even though they may be subjected to some load. It also will be noted that high power is applied to effect movement of the rod 77 when the resistance of the spring 79 is comparatively high. The lower power which effects the initial movement of the rod 77 is such that it is not sufficient to cause the teeth of the gears to engage with sufficient force to injure the same as would be the case if the full power of the solenoid 80 was initially applied. When the switch 75 is returned to its off position, that is the position marked "2," as shown in Fig. 3, the gear cluster 221 is returned to its first or intermediate position, that is the position shown in the drawings, under the action of the spring 78.

The power of the solenoid 80 can be varied, as is well known in the art, and the initial or low power relation to the high power can be varied by changing the ampere turns of the solenoid as by substituting reactances of different value for the reactance 83. Alternatively a variable reactance may be used or the reactance replaced or supplemented by a resistance either fixed or variable. If desired, the ampere turns of the solenoid 80 may be gradually increased as the resistance of the spring 78 builds up by gradually reducing the impedance or resistance of the solenoid circuit in accordance with the movement of the rod 77. One embodiment of mechanism suitable for carrying out such an operation is shown in Fig. 4 and will be hereinafter described.

When it is desired to shift the gear cluster 221 to the left, as viewed in Fig. 2, so as to disengage the gears 64 and 68 and engage the gears 67 and 70, the switch 75 is turned to its lefthand position, that is the position marked "1" in Fig. 3. This establishes a circuit from the line L—1, through the switch 75, wire 91, solenoid 92, wire 93, and reactance 94 to L—2, causing the solenoid 92 to move the rod towards the left under lower power against the resistance of the spring 78. At a predetermined point, as previously explained with reference to movement of the same gear cluster towards the right, substantially coincident with or shortly after the engagement of the teeth of the gear 67 with the teeth of the gear 70, the armature 95 of the solenoid 92 engages a member 96 pivotally supported on the solenoid and operatively connected to a bell crank 97 causing the movable contact 98 thereon to engage stationary contacts 99 and 100 and short out the reactance 94, whereupon full current and voltage is applied to the solenoid 92 to complete the meshing of the gears 67 and 70.

When the switch 75 is returned to the position marked "2," that is to its off position, the gear cluster 221 is returned to its intermediate position by the spring 78. The mechanism disclosed for moving the gear cluster in one direction is the same as that employed for moving the cluster in the opposite direction and any of the remarks made with reference to one mechanism is equally applicable to the other. Suitable stops may be provided for limiting the movement of the rod 77 and a spring-pressed detent engageable within a recess in the rod 77 may be employed to help position and maintain the gear cluster in any one of its three positions if desired. In the event that such a detent is employed to maintain the gear cluster in its intermediate position, the electric circuit can be so arranged that the movement is initiated at high power, after which it continues at low power until the teeth of the gear being meshed engage each other after which it is further continued again at high power. Whether or not it is necessary to initiate the movement at high power will depend upon the resistance effected by the detent.

While in Fig. 2 the invention is illustrated as applied to shifting change gears, it is to be understood that the invention is not limited to shifting gears but is equally applicable to moving any similar machine element or part, such as the movable element of any disengageable and engageable drive connection, for example, reversing or one-way drive clutches of the positive drive type having engaging teeth or of the friction type having engaging friction surfaces. The particular mechanism heretofore described, is especially applied to shifting gears and reversing clutches of the positive drive type having engaging teeth while the preferred mechanism for engaging a friction clutch will be presently referred to.

In operating friction clutches, it is desirable to engage the friction surfaces lightly at first and gradually increase the pressure therebetween so that the load can be picked up gradually and without shock. This is especially true when the friction is employed to impart a rapid traverse movement to a machine element, such as the head, saddle, table, etc., of a horizontal boring machine, the table of a milling machine, and the like. The present invention in addition to the several features heretofore mentioned contemplates the provision of a friction clutch including a solenoid for engaging the same and with means for increasing, preferably gradually, the ampere turns of the solenoid in accordance with the movement of the friction surfaces or elements towards each other.

Figure 5:
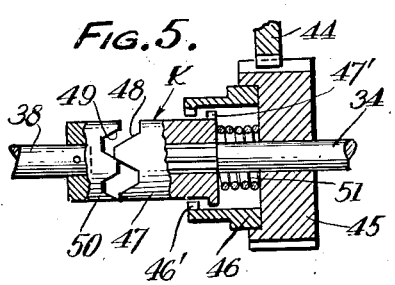
Fig. 5 is a view of a portion of Fig. 4 showing the parts in a different operating position.

Figs. 4 and 5 of the drawings show the present invention embodied in mechanism for imparting a rapid traverse movement to the spindle head, saddle, or table of the horizontal boring machine shown in Fig. 1.

The reference character J designates generally a speed change transmission through the medium of which the spindle head, saddle, table and backrest block may be moved at different rates of feed by the electric motor 21 operatively connected to the transmission J by a V-belt drive 35 and spur gears 36 and 37. The shaft 34 to which the spindle head, saddle, and table operating mechanisms are adapted to be selectively connected is adapted to be driven in either direction depending upon the direction of rotation of the motor 21 from the gear 37 at either a comparatively low feed rate through the transmission J and an overrunning clutch mechanism K or at a high rapid traverse rate through a normally disengaged disc clutch L, shaft 38 and overrunning clutch mechanism K.

The feed change gears are housed within a suitable gear box in the base of the machine and will not be further described. Suffice it to say that the various movable gears are adapted to be shifted as desired by manual levers 127 and 150 operatively connected thereto in a suitable manner. With the friction clutch L disengaged, the drive is through the transmission J and from the driven gear 44 thereof to the gear 45 forming a part of the overrunning clutch mechanism K. The gear 45 is rotatably supported on the shaft 34 and carries the driving element 46 of a normally engaged toothed clutch, the driven element 47 of which is splined on the left-hand end of the shaft 34 and has a plurality of sloping teeth or cam surfaces 48 formed on the left-hand end which cooperate with similar teeth 49 on a high speed driving member 50 fixed to the right-hand end of a high speed shaft 38. The driven clutch element 47 is continuously urged towards the left by a compression spring 51 interposed therebetween and the gear 45. The construction is such that the shaft 34 is normally connected to the transmission J through the normally engaged clutch elements 46 and 47 and the gears 44 and 45.

With the parts in the position shown in Fig. 4 of the drawings, the shaft 38 rotates at the same speed as the gear 45 and the members 47, 34, etc., due to the engagement of the teeth 48 and 49. When the friction clutch L is engaged, the shaft 38 is caused to rotate at a higher rate of speed than the shaft 34, etc. This difference in speed causes the teeth 48 of the slidable clutch element 47 to climb the teeth 49 of the element 50, moving the clutch element 47 to the right, disengaging the teeth 47' thereof from the teeth 46' of the driving clutch element 46 carried by the gear 45. After the clutch 46, 47 is disengaged, the shaft 34 rotates at the same high speed as the shaft 38 since the teeth 49 drive the teeth 48 of the member 47. Movement of the member 47 towards the right is limited by the compression spring 51 so that the teeth 48 and 49 will always be in engagement with each other, the construction of which spring is such that it will not permit the teeth 48 and 49 to clear each other and become disengaged. As shown, both sides of the teeth 48 and 49 are inclined in the same manner, which makes the device operable in either direction of rotation. When the clutch L is disengaged, the spring 51 reengages the teeth of the cooperating clutch elements 48 and 49, thus reestablishing the low speed feed drive through the transmission J.

The actuation of the friction clutch L is controlled by a bell crank lever 42 pivotally supported in the base of the machine, one arm of which is operatively connected to the clutch L through a member 43 slidable on the shaft 38. The other arm of the bell crank lever 42 is connected to the armature 101 of the solenoid 41 and to a spring 102. The spring 102 continuously urges the bell crank lever 42 in a direction to disengage the clutch L and the lever is adapted to be rocked in the opposite direction about its pivot 103 by the solenoid 41 which, when energized, moves the armature 101 in a downward direction. Energization of the solenoid 41 may be controlled in any convenient manner through the wires 559 and 704. Preferably it is controlled in a manner similar to that disclosed in a copending application bearing Serial No. 243,616. According to the present invention when line voltage is applied to the wires 559 and 704, the maximum ampere turns or power of the solenoid 41 is not immediately applied to the clutch L because of a variable resistance 104 connected in series with the solenoid. However, as the discs of the friction clutch L engage each other as the result of downward movement of the armature 101 of the solenoid 41, the resistance 104 is gradually cut out by the moving contact arm 105 which forms one arm of a bell crank lever pivoted on the solenoid case, another arm 106 of which is connected to the armature 101. The construction is such that the clutch L does not "grab" but is lightly engaged at first with the result that the clutch slips and picks up the load gradually. As the load is picked up, the clutch is engaged with increasing pressure until all slip is eliminated.

In the embodiment shown, the resistance 104 is entirely cut out at a predetermined point in the movement of the clutch elements together. This feature of the invention may or may not be employed as desired. When employed, the resistance 104 may be a fixed resistance, in which event the ampere turns of the solenoid will be increased in steps instead of gradually. As shown, the two stationary contacts 108 and 109 connected to the wire 704 and the wire 110 leading from the movable contact arm 105 and the resistance 104, respectively, are adapted to be short circuited or connected together at a predetermined point in the movement of the clutch elements together by a movable contact 111 carried by one arm of a bell crank lever 112 pivoted as at 113 on a member fixed to the solenoid 41. The other arm of the bell crank lever 112 carries a screw 115 adapted to be raised by a lever 116 connected to the levers 105 and 106 and move the contact 111 into engagement with the contacts 108 and 109. The place at which the contact 111 engages the contacts 108 and 109 relative to the position of the movable clutch element can be varied by adjusting the screw 115. A spring 117 interposed between the washer 118 on the screw 115 which engages the arm 116 and the head of the screw allows the arm 116 to continue its movement after the contacts are closed for reasons which are thought to be obvious.

From the foregoing description of the preferred embodiments of the invention, it will be apparent that the objects heretofore enumerated and others have been accomplished and that a novel and improved mechanism including a solenoid has been provided for moving a movable element and that there has been provided a novel and improved machine tool, particularly a horizontal boring machine comprising remote control mechanism including a solenoid for shifting various machine elements thereof, such as change gears, clutches and the like. While the preferred embodiments of the invention have been described with considerable detail, I do not wish to be limited to the particular construction shown which may be varied within the scope of this invention. It is my intention to cover hereby all adaptations, modifications and uses thereof which come within the practice of those skilled in the art to which the present invention relates.

Having thus described my invention I claim:

1. In a horizontal boring machine of the character referred to, the combination of a frame comprising a base provided with a vertical column adjacent to one end thereof, a spindle head member supported for vertical movement along said column, a spindle member supported in said spindle head member, a saddle member movably supported on said base, a table member movably supported on said saddle member, means for moving one of said members, said means including a power transmitting device having an engageable and disengageable drive connection comprising a movable member for engaging and disengaging the drive, means including a solenoid for moving the movable member of said drive connection to engage said drive connection, and means including mechanism responsive to the movement of said movable member of said drive connection for automatically increasing the ampere turns of said solenoid as said movable member of said drive connection is moved in a direction to engage said drive connection.

2. In a horizontal boring machine of the character referred to, the combination of a frame comprising a base provided with a vertical column adjacent to one end thereof, a spindle head member supported for vertical movement along said column, a spindle member supported in said spindle head member, a saddle member movably supported on said base, a table member movably supported on said saddle member, means for moving one of said members, said means including a power transmission having engageable and disengageable members, a pendant control station movably supported on said frame for universal movement, means including a solenoid for producing relative movement between the movable members of said power transmission in a direction to engage said drive connection, a manually operable switch on said pendant control station for controlling the energization of said solenoid, and means including mechanism responsive to the movement of said movable member of said drive connection for automatically increasing the ampere turns of said solenoid as said movable member of said power transmission is moved in a direction to engage said drive connection.

3. In a power transmitting device or the like, the combination of an engageable and disengageable drive connection comprising a slidable member, means including a solenoid for moving said slidable member to engage said drive connection, and means including mechanism responsive to the movement of said slidable member for automatically increasing the ampere turns of said solenoid as said slidable member is moved in a direction to engage said drive connection.

4. In a power transmitting device or the like, the combination of engageable and disengageable toothed members, means including a solenoid for producing relative movement between said toothed members in a direction to engage said toothed members, and means including mechanism responsive to said relative movement between said toothed members for automatically increasing the ampere turns of said solenoid upon relative movement between said toothed members in a direction to engage said toothed members.

5. In a power transmitting device or the like, the combination of engageable and disengageable gears, means including a solenoid for producing relative movement between said gears in a direction to engage said gears, and means including mechanism responsive to said relative movement between said gears for automatically increasing the ampere turns of said solenoid upon relative movement between said gears in a direction to engage said gears.

6. In a power transmitting device or the like, the combination of engageable and disengageable toothed members, means including a solenoid for producing relative movement between said toothed members in a direction to engage said toothed members, and means including mechanism responsive to said relative movement between said toothed members for automatically increasing the ampere turns of said solenoid upon relative movement between said toothed members in a direction to engage said toothed members coincident with the initial contact between said toothed members.

7. In a power transmitting device or the like, the combination of engageable and disengageable gears, means including a solenoid for producing relative movement between said gears in a direction to engage said gears, and means including mechanism responsive to said relative movement between said gears for automatically increasing the ampere turns of said solenoid upon relative movement between said gears in a direction to engage said gears coincident with the initial contact between said gears.

8. In a power transmitting device or the like, the combination of a speed change transmission comprising a plurality of engageable and disengageable gears, means including a solenoid for producing relative movement between said gears in a direction to engage said gears, and means including mechanism responsive to said relative movement between said gears for automatically increasing the ampere turns of said solenoid upon relative movement between said gears in a direction to engage said gears.

9. In a power transmitting device or the like, the combination of an engageable and disengageable drive connection comprising a slidable member having three normal positions, resilient means for continuously urging said slidable member into the intermediate of said three positions, means including a plurality of solenoids for moving said slidable member into the other of said positions, means for selectively energizing said solenoids, and means including mechanism responsive to the movement of said slidable member for automatically increasing the ampere turns of said solenoids as said slidable member is moved from said intermediate position into one or the other of said other positions.

10. In a power transmitting device or the like, the combination of an engageable and disengageable frictional clutch comprising a slidable member, means including a solenoid for moving said slidable member to engage said frictional clutch, and means including mechanism responsive to the movement of said slidable member for automatically increasing the ampere turns of said solenoid as said slidable member is moved in a direction to engage said clutch.

11. In a machine tool or the like, the combination of a frame, a pendant control station supported by said frame, a tool supporting member, a work supporting member, means for movably supporting one of said members on said frame for movement relative to said frame, power means including an engageable and disengageable drive connection comprising a slidable member for moving said movable supported member relative to said frame, means including a solenoid for moving said slidable member to engage said drive connection, manually operable means on said pendant control station for energizing said solenoid, and means including mechanism responsive to the movement of said slidable member for automatically increasing the ampere turns of said solenoid as said slidable member is moved in a direction to engage said drive connection.

HALLIS N. STEPHAN.